UNITED STATES PATENT OFFICE.

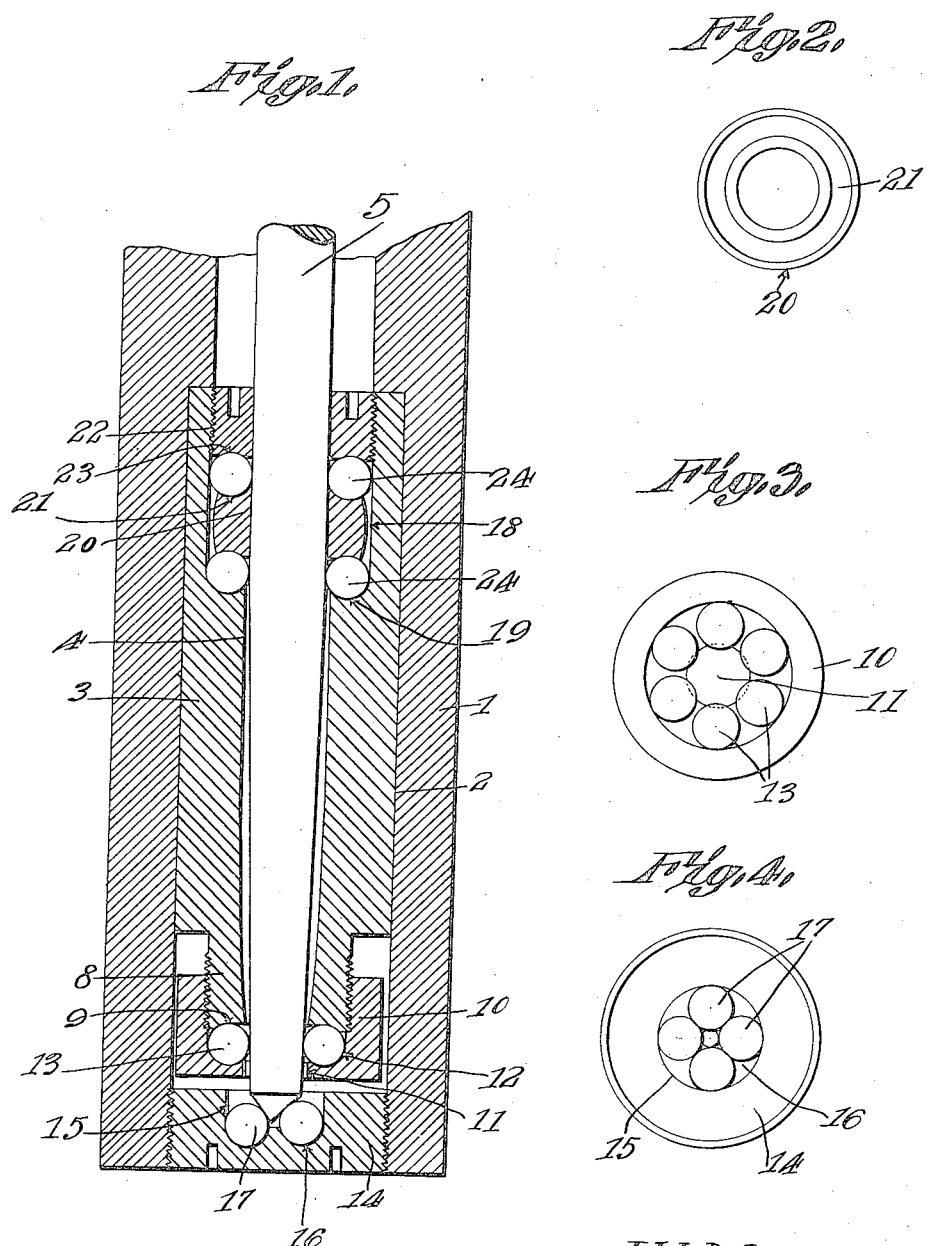

JOHN H. MAYES, OF CHARLOTTE, NORTH CAROLINA.

BALL-BEARING FOR SPINDLES.

1,305,144.

Specification of Letters Patent. Patented May 27, 1919.

Application filed August 17, 1917. Serial No. 186,765.

*To all whom it may concern:*

Be it known that I, JOHN H. MAYES, a citizen of the United States, residing at Charlotte, in the county of Mecklenburg and State of North Carolina, have invented a new and useful Ball-Bearing for Spindles, of which the following is a specification.

The present invention relates to improvements in bearings for spinning, twisting and roving spindles used in cotton machinery, and is particularly an improvement over the ball bearing for spindles disclosed in my Patent 1248885, dated Dec. 4, 1917.

The invention has for its object the provision of improved means for mounting the vertical spindle for rotation with a minimum amount of friction, the structure being simple and inexpensive, and the component elements being assembled in a practical and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein—

Figure 1 is a vertical central section of the bearing.

Fig. 2 is a plan view of the spindle collar.

Fig. 3 is a plan view of the ball cap.

Fig. 4 is a similar view of the ball cup of step bearing.

The numeral 1 designates a bolster or other supporting member for the vertical tubular spindle casing or socket member 3 fitted within a vertical bore 2 in said bolster or member 1. The casing 3 has a vertical downwardly tapered bore 4 for receiving the lower tapered terminal of the spindle 5 which is spaced from the walls of said bore. The lower end of the casing 3 has a depending boss 8 of reduced diameter, the end of which is provided with an annular ball race 9, and a cap 10 is threaded upwardly onto the boss 8 and has a central aperture 11 to allow the spindle 5 to project loosely therethrough from the lower end of the casing. The cap 10 has an annular ball race 12 underneath the ball race 9, and an annular set of rolling balls 13 are seated in the ball race 12 snugly underneath the ball race 9, and project inwardly through the annular slot between the ball races 9 and 12 to contact with the spindle and take up lateral strains. The balls 13 center the lower extremity of the spindle.

A ball cup 14, forming a part of step bearing, is threaded upwardly into the bore 2 underneath the cap 10 and spindle, and is provided with an upper recess 15 and an annular ball race 16 in the bottom of said recess in which rolling balls 17 are seated for the contact therebetween of the lower conical end of the spindle, thereby supporting said spindle for free rotary movement.

The casing 3 has a counter bore 18 extending from its upper end, the shoulder of which is provided with an annular upwardly facing ball race 19. A collar 20 is fitted tightly upon the spindle within the counter bore 18, and its opposite faces are provided with annular ball races 21 facing upwardly and downwardly. A ring or annular plug 23 is threaded or otherwise engaged within the open end of the counter bore 18 and loosely surrounds the spindle, said ring having a lower annular ball race 23. Two sets of anti-frictional rolling balls 24 are disposed between the ball races 21 and the ball races 19 and 23, whereby when the collar 20 rotates with the spindle, the balls 24 will take up longitudinal as well as transverse strains, said collar moving loosely within the counter bore 18, and preferably having its periphery curved transversely.

Having thus described the invention, what is claimed is:—

The combination with a supporting member having a counter bore extending thereinto from one end and a screw plug constituting a closure for one end of the counter bore and having a recess in the inner face thereof, of balls mounted for movement within the recess, a spindle having a tapered end bearing on said balls, a casing fitted within the counter bore and having one end abutting against the inner end of the counter bore and its other end reduced in diameter and externally screw threaded, a cap detachably engaging the reduced threaded end of said casing and coöperating therewith to hold bearing balls, a counter bore in the other end of said casing, a screw plug detachably mounted in the ends thereof, a collar fitted tightly on the spindle and loosely mounted within and spaced from the wall of the counter bore in said casing, and ball bearings disposed between the collar and the inner end of the counter bore and the screw plug respectively.

In testimony that I claim the foregoing as my own I have hereto affixed my signature in the presence of two witnesses.

JOHN H. MAYES.

Witnesses:
 WILLIE HOOD,
 IRENE BECK.